(12) United States Patent
Toyama et al.

(10) Patent No.: US 11,747,230 B2
(45) Date of Patent: Sep. 5, 2023

(54) SENSOR DEVICE

(71) Applicant: JTEKT CORPORATION, Kariya (JP)

(72) Inventors: Yuichi Toyama, Owariasahi (JP); Toshiaki Murakami, Nagoya (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 17/558,225

(22) Filed: Dec. 21, 2021

(65) Prior Publication Data

US 2022/0205857 A1 Jun. 30, 2022

(30) Foreign Application Priority Data

Dec. 25, 2020 (JP) .................. 2020-216515

(51) Int. Cl.
*G01L 5/22* (2006.01)
*B62D 15/02* (2006.01)

(52) U.S. Cl.
CPC .......... *G01L 5/221* (2013.01); *B62D 15/0215* (2013.01)

(58) Field of Classification Search
CPC ..................... G01L 5/221; B62D 15/0215
See application file for complete search history.

(56) References Cited

U.S. PATENT DOCUMENTS

2020/0217732 A1* 7/2020 Toyama ............ B62D 15/0215
2020/0307694 A1* 10/2020 Toyama ................... G01D 5/04

FOREIGN PATENT DOCUMENTS

| EP | 3 680 149 A1 | 7/2020 |
| EP | 3 715 221 A1 | 9/2020 |
| JP | 2007-192609 A | 8/2007 |
| JP | 2010-286299 A | 12/2010 |
| JP | 2010286299 A | * 12/2010 |
| JP | 2020-112390 A | 7/2020 |

OTHER PUBLICATIONS

May 11, 2022 Extended Search Report issued in European Patent Application No. 21217384.3.

* cited by examiner

*Primary Examiner* — Jamel E Williams
(74) *Attorney, Agent, or Firm* — Oliff PLC

(57) ABSTRACT

A sensor device includes a main driving gear, driven gears, an biasing member configured to bias the driven gears toward the main driving gear, a support member configured to support the biasing member, and a sensor configured to generate an electrical signal based on rotation of the driven gears. In a force applied when the biasing member biases the driven gears, assuming that a direction orthogonal to a tangent line at a point of action of the force is set as a first direction, the first direction is different from a second direction.

6 Claims, 10 Drawing Sheets

SENSOR DEVICE

CROSS-REFERENCE TO RELATED APPLICATION

This application claims priority to Japanese Patent Application No. 2020-216515 filed on Dec. 25, 2020, incorporated herein by reference in its entirety.

BACKGROUND

1. Technical Field

The present disclosure relates to a sensor device.

2. Description of Related Art

Japanese Unexamined Patent Application Publication No. 2020-112390 (JP 2020-112390 A) discloses a sensor device that detects a rotation angle of a rotating shaft. The sensor device has a main driving gear fixed to a rotating shaft and two driven gears that engage with the main driving gear. Each of the driven gears has a gear portion that engages with teeth of the main driving gear, and a shaft portion that extends from a side surface of the gear portion along an axis of the gear portion. The shaft portion of the driven gear is rotatably supported in a support hole included in a support member for supporting parts of the sensor device such as the driven gear.

The sensor device described in JP 2020-112390 A detects a rotation angle of the driven gear by a sensor provided corresponding to each of the two driven gears and calculates a rotation angle of the rotating shaft based on the detected rotation angle of the driven gear. Such a sensor device has a biasing member that biases the driven gear toward the main driving gear so as to reduce backlash between the main driving gear and the driven gear.

SUMMARY

For example, when the shaft portion of the driven gear is supported inside the support hole with a clearance, the shaft portion operates within the clearance range in a rotation direction as the main driving gear rotates. In this case, the axis of the driven gear shifts, and a position of the shaft portion of the driven gear with respect to the corresponding sensor changes. The accuracy of the detection result of the sensor may vary due to the change in the position of the shaft portion of the driven gear with respect to the corresponding sensor.

An aspect of the present disclosure is a sensor device. The sensor device includes a main driving gear fixed to a rotating shaft to be detected, driven gears each including a gear portion that engage with teeth of the main driving gear and provided with a shaft portion extending from a side surface of the gear portion along an axis of the gear portion, an biasing member configured to bias the driven gears toward the main driving gear, a support member having a support hole that rotatably supports the shaft portion, and configured to support the driven gears through support of the shaft portion and to support the biasing member, and a sensor configured to generate an electrical signal based on rotation of the driven gears. In a force applied when the biasing member biases the driven gears, assuming that a direction orthogonal to a tangent line at a point of action of the force is set as a first direction, the first direction is different from a second direction, where the second direction is a direction that contributes to reduction of backlash generated between the driven gears and the main driving gear when the driven gears operate toward the main driving gear when the driven gears are biased toward the main driving gear.

With such a configuration, the force applied when the biasing member biases the driven gears can be decomposed into a component force in the second direction and a component force in a direction orthogonal to the second direction. The driven gear is pressed toward the main driving gear by an action of the component force in the second direction. Thus, the backlash generated between the driven gear and the main driving gear while the force in the first direction acts is reduced. Further, the shaft portion is pressed toward the inner circumferential surface of the support hole by an action of the component force in the direction orthogonal to the second direction. Therefore, for example, even when the shaft portion is supported in the support hole with a clearance, the operation of the driven gear within a range of the clearance is restricted while the force in the first direction acts. In this case, while a force acting to reduce the backlash generated between the driven gear and the main driving gear is secured, it is also possible to secure a force acting to restrict the operation of the driven gear within the range of the clearance. Therefore, the operation of the driven gear is restricted even when the main driving gear rotates. In this case, the axis of the driven gear is shifted, and a change in the position of the shaft portion of the driven gear with respect to the corresponding sensor is curbed, and variation in accuracy of detection results of the sensor is curbed.

In the sensor device, positions of the driven gears and the biasing member may be adjusted so that, in a force acting in the first direction, a component force decomposed in a third direction has a magnitude that can maintain a state in which the driven gears are pressed toward an inner circumferential surface of the support hole even when the main driving gear rotates. The third direction may be a direction orthogonal to the second direction.

With such a configuration, since the positions of the driven gear and the biasing member are adjusted, for example, it is possible to adjust the force in each of the directions, such as preventing the component force to be decomposed in the second direction from becoming unnecessarily large while ensuring a sufficient magnitude of the component force to be decomposed in the third direction.

In the sensor device, the support member may have the support hole having an elongated shape that extends in the second direction and having two arc portions that are separated from each other in the second direction and two linear portions that connect the two arc portions in the second direction. Positions of the driven gears and the biasing member may be adjusted so that the third direction intersects one of the two linear portions of the support hole that is separated from the point of action.

With such a configuration, in one of the two linear portions of the support hole that is separated from the point of action, a reaction force due to the component force in the third direction is generated. This reaction force is generated as a normal force in defining a frictional force generated between the inner circumferential surface of the support hole and the outer circumferential surface of the shaft portion pressed toward the inner circumferential surface. Thus, a state in which the shaft portion is pressed toward the inner circumferential surface of the support hole can be suitably maintained.

In the sensor device, the driven gears may include a first driven gear and a second driven gear. The biasing member may be a torsion coil spring including a coil portion that generates bending stress when a load is applied and two arm portions that extend in different directions from both ends of the coil portion. The two arm portions may include a first arm portion that biases the first driven gear toward the main driving gear side, and a second arm portion that biases the second driven gear toward the main driving gear side.

With such a configuration, one member may be provided as the biasing member for the first and second driven gears. Therefore, in the sensor device, increase in the number of parts can be curbed.

In the sensor device, the support member may include a coil support portion that supports the coil portion. The coil support portion may be provided on a side opposite to a side on which the main driving gear is provided with reference to a virtual line obtained by extending a line segment that connects axes of the shaft portions of the first driven gear and the second driven gear. The coil portion may generate bending stress while being supported by the coil support portion when a load is applied in a direction in which the first arm portion and the second arm portion are deformed to the side opposite to the side on which the main driving gear is provided. Each of the first arm portion and the second arm portion may include a base end portion that extends from the coil portion to the side on which the main driving gear is provided, and a tip end portion that extends from the base end portion to the side opposite to the side on which the main driving gear is provided. The tip end portion may be a point of action of a force applied when the biasing member biases the driven gears.

With such a configuration, each of the tip end portions of the first arm portion and the second arm portion comes into contact with the shaft portion of the driven gear to be biased at a portion on the side of the other driven gear opposite to the driven gear to be biased. In this case, the first direction is different from the second direction as the biasing member biases the driven gear toward the main driving gear. Thus, for example, even when the coil portion needs to be supported by the support member on the side opposite to the side on which the main driving gear is provided with reference to the virtual line due to a relation with other configurations, in the sensor device, it is possible to realize a configuration in which the operation of the driven gear can be restricted even when the main driving gear rotates.

The sensor device may further include a tubular member that rotatably surrounds the shaft portion. The biasing member may be configured to bias the driven gears toward the main driving gear through biasing of the tubular member.

With such a configuration, it is possible to prevent the biasing member from coming in direct contact with the shaft portion by providing the tubular member. Thus, it is possible to curb wear of the shaft portion due to direct contact with the biasing member.

According to the sensor device of the present disclosure, it is possible to curb a variation in the accuracy of the detection results of the sensor that detects the rotation angle of the driven gear.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
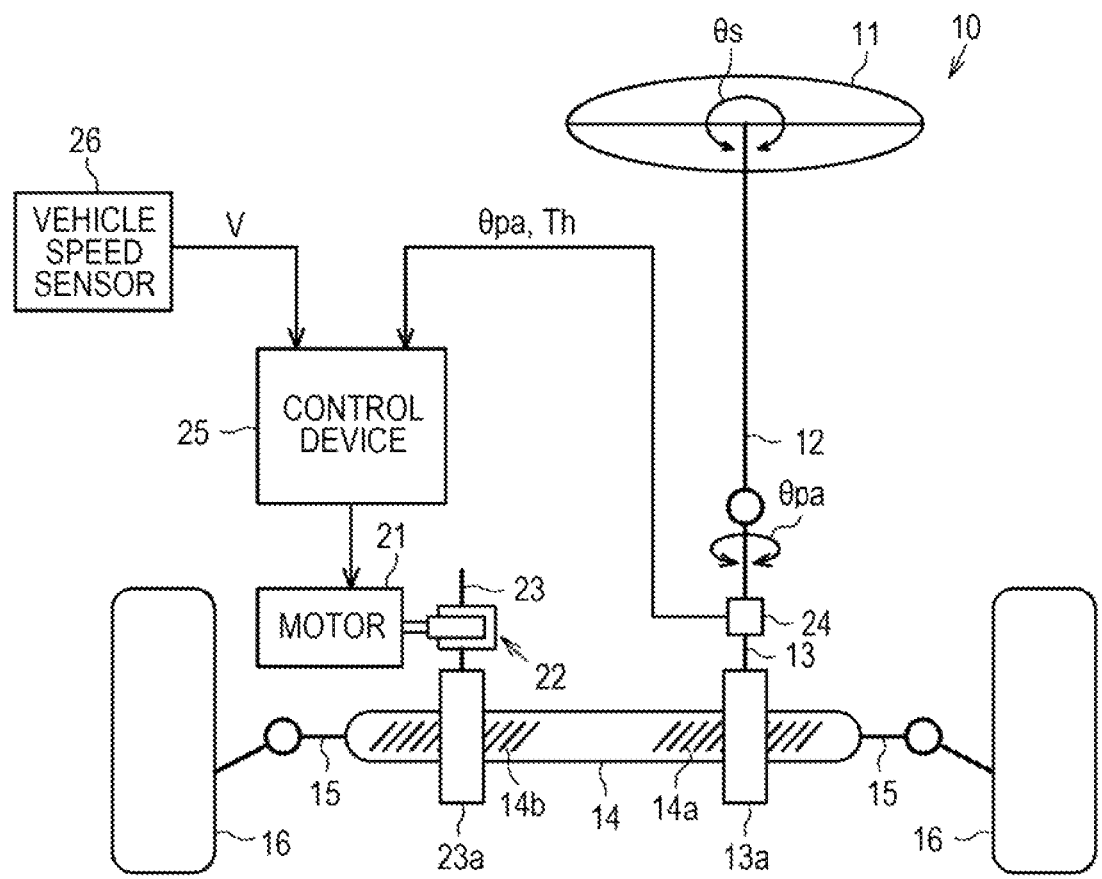
FIG. 1 is a schematic configuration diagram of a steering device.

Hereinafter, an embodiment in which a sensor device is applied to a steering device will be described with reference to the drawings. As shown in FIG. 1, the steering device 10 includes a steering shaft 12 connected to a steering wheel 11, a first pinion shaft 13, a turning shaft 14, a motor 21, a speed reduction mechanism 22, a second pinion shaft 23, a sensor device 24, and a control device 25. The steering device 10 is an electric power steering device.

The steering shaft 12 is connected to the steering wheel 11. The first pinion shaft 13 is provided at an end portion of the steering shaft 12 on the side opposite to the steering wheel 11. Pinion teeth 13a of the first pinion shaft 13 engage with rack teeth 14a of the turning shaft 14 that extends in a direction intersecting the first pinion shaft 13. Right and left turning wheels 16 are connected to both ends of the turning shaft 14 via tie rods 15, respectively.

The motor 21 is a source of a steering auxiliary force. For example, a three-phase brushless motor is adopted as the motor 21. The motor 21 is connected to the second pinion shaft 23 via the speed reduction mechanism 22. Pinion teeth 23a of the second pinion shaft 23 engage with rack teeth 14b of the turning shaft 14. Rotation of the motor 21 is decelerated by the speed reduction mechanism 22, and the decelerated rotational force is transmitted from the second pinion shaft 23 to the first pinion shaft 13 via the turning shaft 14 as a steering auxiliary force.

A detection target of the sensor device 24 is the first pinion shaft 13 that is a rotation shaft. The sensor device 24 detects a torque acting on the first pinion shaft 13 as a steering torque Th through a steering operation of a driver with respect to the steering wheel 11. Further, the sensor device 24 detects a rotation angle θpa of the first pinion shaft 13 over multiple rotations beyond 360 degrees as a steering angle θs.

Various sensors including the sensor device 24 and a vehicle speed sensor 26 provided in a vehicle are connected to the control device 25. For example, the steering torque Th and the steering angle θs detected by the sensor device 24 are input to the control device 25. Further, a vehicle speed V detected by the vehicle speed sensor 26 is input to the control device 25. The control device 25 generates a rotational force of the motor 21 by performing energization control on the motor 21 based on the detection results of the various sensors including the steering torque Th, the steering angle θs, and the vehicle speed V. Thus, the control device 25 assists the driver in the steering operation by applying the rotational force of the motor 21 to the first pinion shaft 13 as the steering auxiliary force based on the operation of the driver with respect to the steering wheel 11.

A configuration of the sensor device 24 will be described. In the following, for convenience of explanation, the side on which the steering shaft 12 is provided is referred to as the upper side, and the side on which the turning shaft 14 is provided is referred to as the lower side with reference to the first pinion shaft 13. Further, a direction along the axis of the first pinion shaft 13 is referred to as an axial direction, a direction orthogonal to the axis of the first pinion shaft 13 is referred to as a radial direction, and a direction around the axis of the first pinion shaft 13 is referred to as a circumferential direction.

Figure 2:
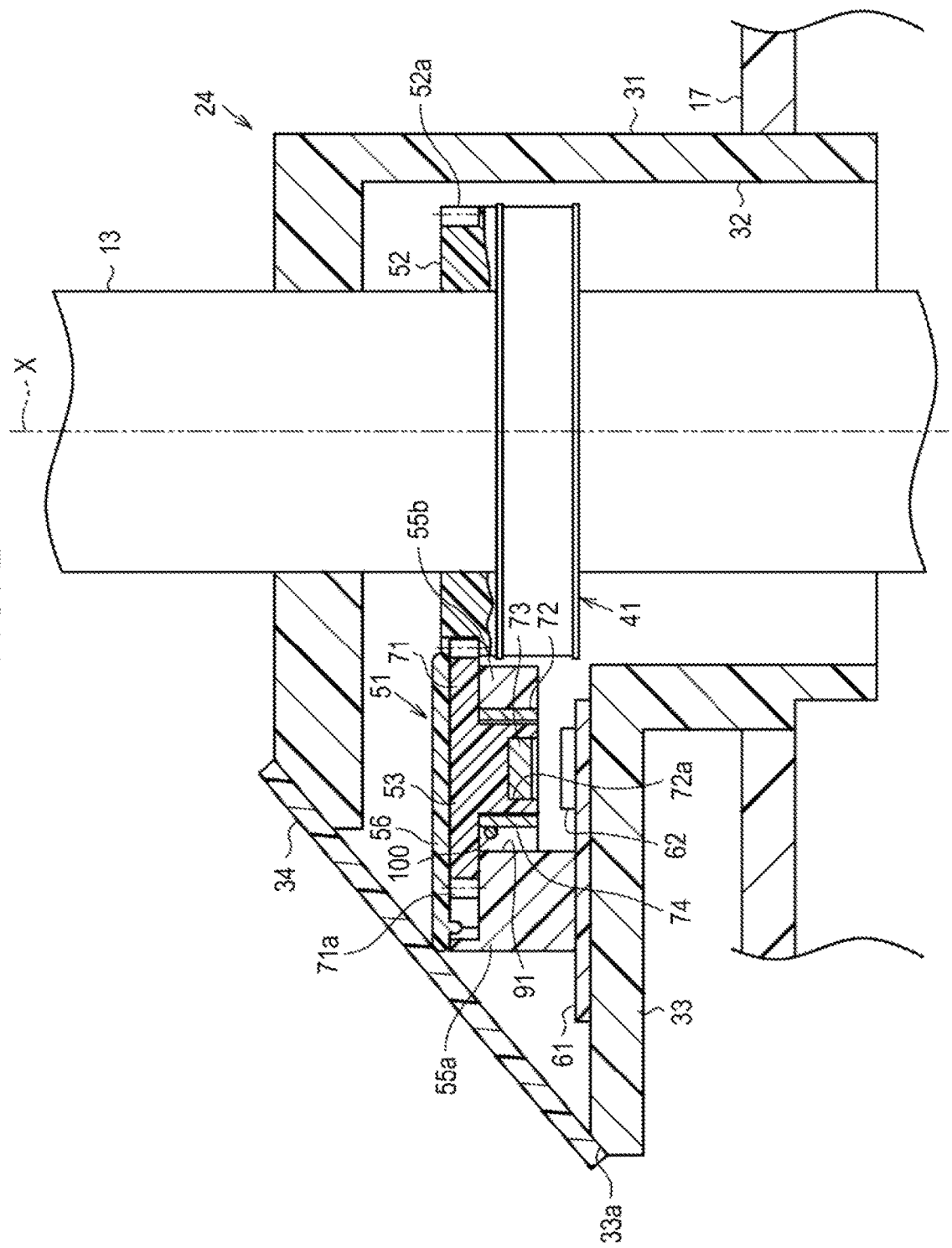
FIG. 2 is a cross-sectional view of a sensor device cut along a surface including an axis of a first driven gear.

As shown in FIG. 2, the sensor device 24 includes a sensor housing 31, a torque sensor device 41, and a rotation angle sensor device 51. The torque sensor device 41 detects the steering torque Th. The rotation angle sensor device 51 detects the steering angle θs. That is, the sensor device 24 of the present embodiment is a torque angle sensor device in which the torque sensor device 41 and the rotation angle sensor device 51 are combined.

The sensor housing 31 is mounted in a gear housing 17 that accommodates the turning shaft 14 and the first pinion shaft 13. The sensor housing 31 has an insertion portion 32 and an extension portion 33 which communicate with each other. The insertion portion 32 has a tubular shape. The insertion portion 32 extends in the axial direction. The first pinion shaft 13 is inserted through the insertion portion 32. The first pinion shaft 13 includes an input shaft on the steering shaft 12 side, an output shaft on the turning shaft 14 side, and a torsion bar that connects the input shafts and output shafts to each other. The extension portion 33 has a box shape. The extension portion 33 extends in the radial direction from the insertion portion 32. The extension portion 33 has an opening portion 33a that extends from the insertion portion 32, then intersects the axial direction and opens upward in the axial direction. The opening portion 33a is closed by a cover 34 from the outside of the sensor housing 31. The torque sensor device 41 and the rotation angle sensor device 51 are accommodated in an internal region of the insertion portion 32 and the extension portion 33 defined in this way.

Figure 3:
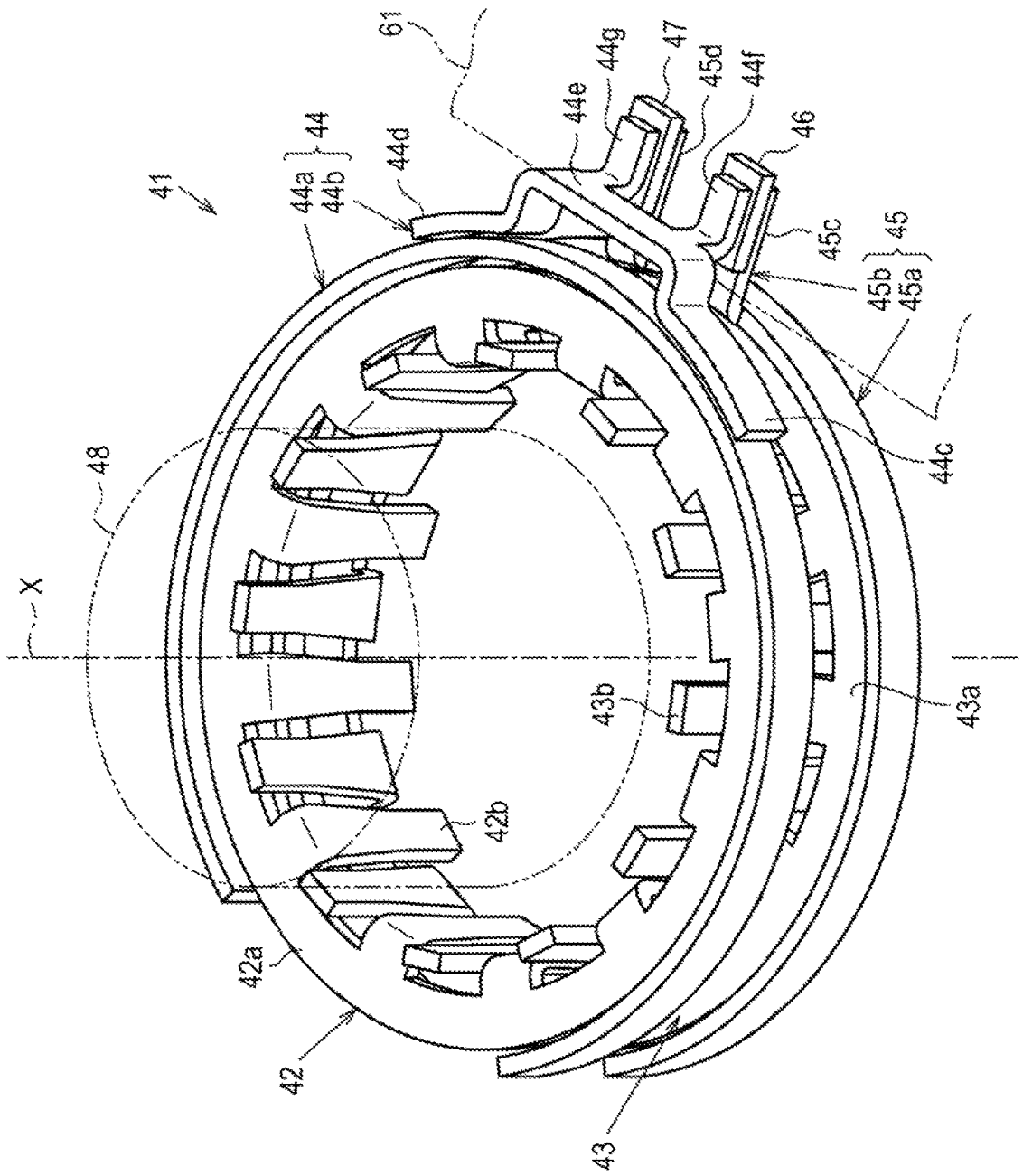
FIG. 3 is a perspective view showing a schematic configuration of a torque sensor device.

Specifically, as shown in FIG. 3, the torque sensor device 41 includes two magnetic yokes including a first magnetic yoke 42 and a second magnetic yoke 43, two magnetic collecting rings including a first magnetic collecting ring 44 and a second magnetic collecting ring 45, two magnetic sensors including a first magnetic sensor 46 and a second magnetic sensor 47, and a permanent magnet 48.

The permanent magnet 48 has a cylindrical shape. The permanent magnet 48 is fitted to be integrally rotatable with respect to the input shaft. In the permanent magnet 48, for example, north (N) poles and south (S) poles are alternately magnetized in the circumferential direction of the input shaft.

Each of the magnetic yokes 42, 43 is disposed to surround the permanent magnet 48 in the circumferential direction with a gap in the radial direction with respect to the permanent magnet 48. Each of the magnetic yokes 42, 43 has a cylindrical shape. Each of the magnetic yokes 42, 43 is integrally rotatably fitted to the output shaft. Each of the magnetic yokes 42, 43 forms a part of a magnetic circuit corresponding to a magnetic field of the permanent magnet 48. The first magnetic yoke 42 and the second magnetic yoke 43 are disposed side by side in the axial direction.

The first magnetic yoke 42 has a first annular portion 42a having a ring shape. The first annular portion 42a extends continuously in the circumferential direction so as to surround the entire circumference of the permanent magnet 48. The first annular portion 42a is provided with a plurality of plate-shaped first tooth portions 42b that are portions protruding downward in the axial direction from an end portion of the first annular portion 42a on the inner circumferential side. The first tooth portions 42b are provided at equal intervals in the circumferential direction of the first annular portion 42a. The second magnetic yoke 43 has a second annular portion 43a and a plurality of second tooth portions 43b as a configuration corresponding to the first magnetic yoke 42.

The magnetic yokes 42, 43 are combined so that the first tooth portions 42b and the second tooth portions 43b protrude in different directions in the axial direction. Further, the first tooth portions 42b and the second tooth portions 43b are disposed alternately in the circumferential direction so as not to overlap each other in the radial direction. That is, the second tooth portions 43b are disposed with a gap between adjacent first tooth portions 42b in the circumferential directions, and the first tooth portions 42b are disposed with a gap between the adjacent second tooth portions 43b in the circumferential direction.

The first magnetic collecting ring 44 is disposed so as to surround the first magnetic yoke 42 in the circumferential direction with a gap in the radial direction with respect to the first magnetic yoke 42. The second magnetic collecting ring 45 is disposed so as to surround the second magnetic yoke 43 in the circumferential direction with a gap in the radial direction with respect to the second magnetic yoke 43. Each of the magnetic collecting rings 44, 45 forms a part of a magnetic circuit corresponding to the magnetic field of the permanent magnet 48. The first magnetic collecting ring 44 and the second magnetic collecting ring 45 are disposed side by side in the axial direction.

The first magnetic collecting ring 44 has a first tubular portion 44a having a C-shaped tubular shape when seen in the axial direction. The first tubular portion 44a extends continuously in the circumferential direction so as to surround a part of an outer circumference of the first annular portion 42a of the first magnetic yoke 42. A first magnetic collecting portion 44b is connected to an outer circumferential surface of the first tubular portion 44a.

The first magnetic collecting portion 44b has two fixing portions 44c, 44d that are portions fixed to the outer circumferential surface of the first tubular portion 44a. The fixing portions 44c, 44d are disposed at predetermined intervals in the circumferential direction of the first tubular portion 44a. Further, the first magnetic collecting portion 44b has a connecting portion 44e that is a portion for connecting between the fixing portions 44c, 44d. The connecting portion 44e has a gap in the radial direction between the connecting portion 44e and the outer circumferential surface of the first tubular portion 44a. Further, the first magnetic collecting portion 44b includes two first magnetic collecting protrusion portions 44f, 44g that are portions protruding outward in the radial direction from an end portion of the connecting portion 44e on the second magnetic collecting ring 45 side in the axial direction. The first magnetic collecting protrusion portions 44f, 44g are disposed at predetermined intervals in the circumferential direction of the first tubular portion 44a. Each of the first magnetic collecting protrusion portions 44f, 44g has a substantially rectangular shape when seen in the axial direction.

The second magnetic collecting ring 45 is provided with a second tubular portion 45a and a second magnetic collecting portion 45b as a configuration corresponding to the first magnetic collecting ring 44. The second magnetic collecting portion 45b includes two second magnetic collecting protrusion portions 45c, 45d that are portions protruding outward in the radial direction from the end portion of the second tubular portion 45a on the first magnetic collecting ring 44 side in the axial direction as portions corresponding to the first magnetic collecting protrusion portions 44f, 44g.

The magnetic sensors 46, 47 are provided on one end surface on the upper side in the axial direction that is a thickness direction of a substrate 61 shown in FIG. 2. One end surface side of the substrate 61 on the lower side in the axial direction that is the side opposite to the side on which the magnetic sensors 46, 47 are provided is fixed to an inner bottom surface of the extension portion 33 of the sensor housing 31. As each of the magnetic sensors 46, 47, for example, a Hall sensor may be adopted. The first magnetic sensor 46 is disposed between the first magnetic collecting protrusion portion 44f and the second magnetic collecting protrusion portion 45c. Further, the second magnetic sensor 47 is disposed between the first magnetic collecting protrusion portion 44g and the second magnetic collecting protrusion portion 45d. Each of the magnetic sensors 46, 47 detects a magnetic flux of a magnetic circuit formed of the permanent magnet 48, the first magnetic yoke 42, the second magnetic yoke 43, the first magnetic collecting ring 44, and the second magnetic collecting ring 45 as an electrical signal.

When a relative rotational displacement occurs between the input shaft and the output shaft of the first pinion shaft 13 through the steering operation of the driver, twisting deformation is generated on the torsion bar. In a state in which the twisting deformation is generated on the torsion bar, each of the first tooth portions 42b is shifted in the circumferential direction with respect to a state in which the twisting deformation is not generated on the torsion bar, and thus an angle difference is generated. This also applies to each of the second tooth portions 43b. Thus, in the state in which the twisting deformation is generated on the torsion bar, the magnetic circuit corresponding to a magnetic field of the permanent magnet 48 is formed at each of the magnetic yokes 42, 43 and each of the magnetic collecting rings 44, 45, and thus a magnetic flux corresponding to an amount of the twisting deformation of the torsion bar is transmitted to each of the tooth portions 42b, 43b. Then, each of the magnetic sensors 46, 47 generates an electrical signal corresponding to the magnetic flux of the magnetic circuit induced by the twisting deformation of the torsion bar. The control device 25 shown in FIG. 1 and connected to each of the magnetic sensors 46, 47 calculates a torque acting on the first pinion shaft 13 as the steering torque Th based on the electrical signal generated by each of the magnetic sensors 46, 47.

Figure 4:
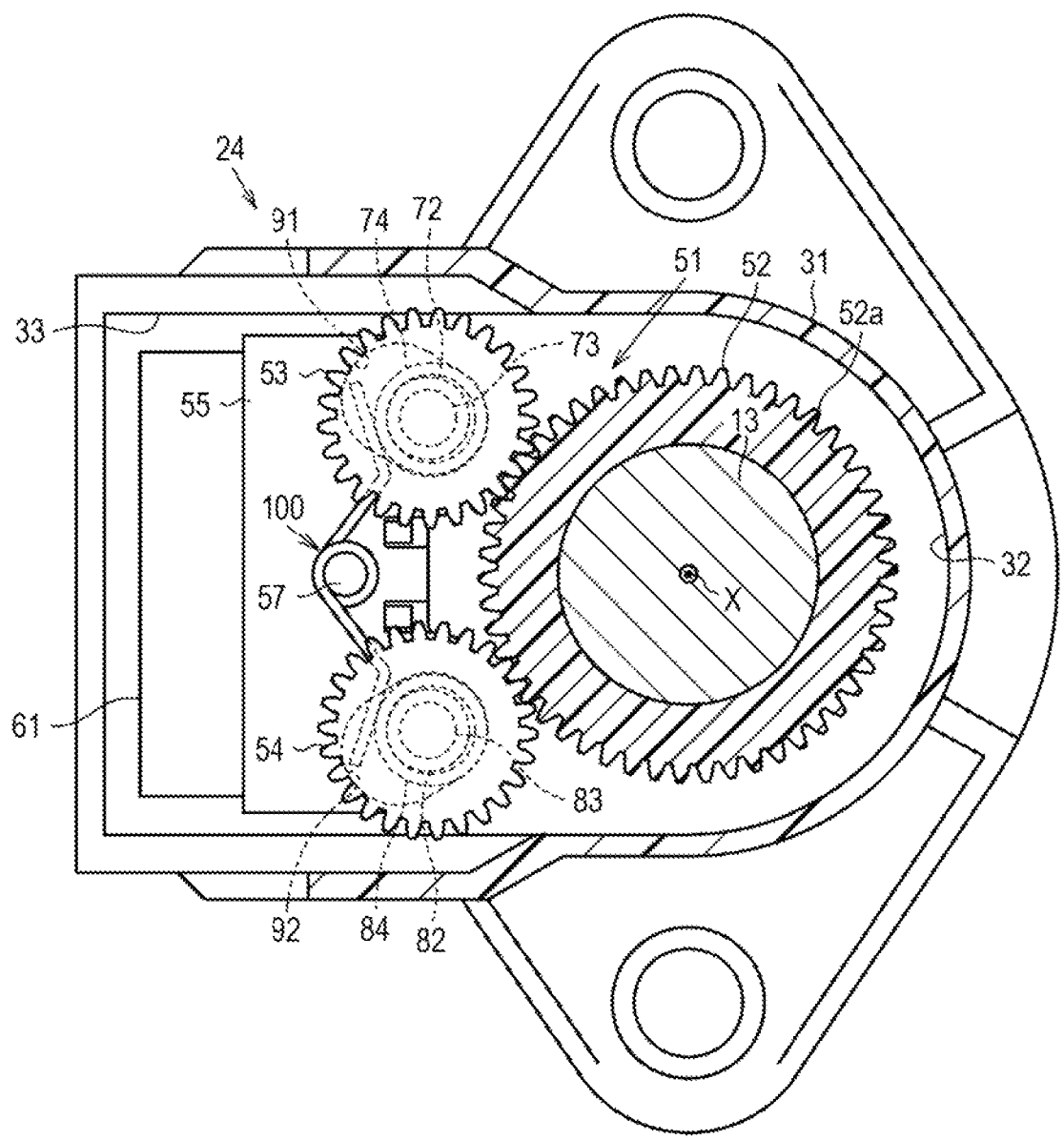
FIG. 4 is a partial cross-sectional view of FIG. 2 cut along a surface between a support member and a stopper and seen from a substrate side in an axial direction of a first pinion shaft.

As shown in FIGS. 2 and 4, the rotation angle sensor device 51 includes a main driving gear 52, two driven gears of a first driven gear 53 and a second driven gear 54, a support member 55, a stopper 56, two tubular members of a first tubular member 74 and a second tubular member 84, an biasing member 100, and two magnetic sensors of a first magnetic sensor 62 and a second magnetic sensor 63.

The main driving gear 52 has a cylindrical shape. A plurality of teeth 52a is provided on an outer circumferential surface of the main driving gear 52. The main driving gear 52 is integrally rotatably fitted to the first pinion shaft 13. The main driving gear 52 is made of, for example, a resin.

As shown in FIG. 2, the support member 55 has a contact portion 55a and a facing portion 55b. The contact portion 55a is fixed to an inner bottom surface of the extension portion 33 of the sensor housing 31 via the substrate 61. The facing portion 55b faces the substrate 61 with a gap therebetween in the axial direction.

Figure 5:
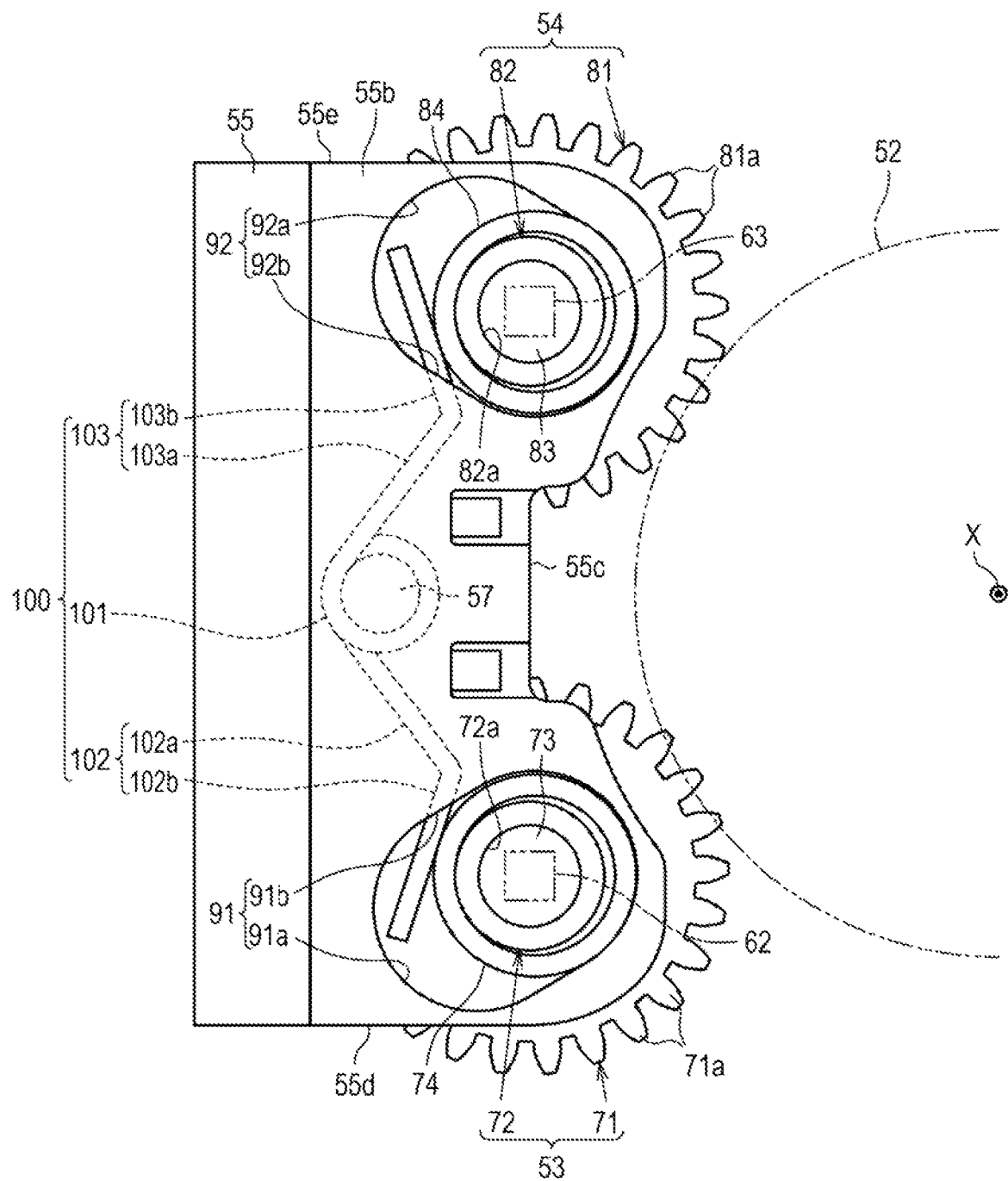
FIG. 5 is a partial cross-sectional view of FIG. 2 cut along a surface between the support member and a substrate and seen from the substrate side in the axial direction of the first pinion shaft.

Specifically, as shown in FIGS. 4 and 5, the support member 55 has a rectangular shape when seen in the axial direction. The support member 55 has a long side portion 55c that is a portion of the facing portion 55b on the right side in FIG. 5 and defines one of two long sides. The support member 55 rotatably supports the driven gears 53, 54 in a state in which a part of each of the gear portions 71, 81 is exposed from the long side portion 55c. The support member 55 is disposed so that the long side portion 55c, that is, the facing portion 55b side faces the main driving gear 52.

As shown in FIG. 5, in the support member 55, a first support hole 91 and a second support hole 92 are provided in the facing portion 55b that faces the substrate 61. Each of the support holes 91, 92 is a through hole that passes through the facing portion 55b in the axial direction that is the thickness direction. The support holes 91, 92 are respectively provided in the vicinity of both ends of the long side portion 55c. That is, in the support member 55, the first support hole 91 is provided in the vicinity of a short side portion 55d that is a portion of the facing portion 55b on the lower side in FIG. 5 and defines one of two short sides. Further, in the support member 55, the second support hole 92 is provided in the vicinity of a short side portion 55e that is a portion of the facing portion 55b on the upper side in FIG. 5 and defines the other one of the two short sides.

Each of the support holes 91, 92 has an elongated hole shape extending in the radial direction that is a direction toward an axis X when seen in the axial direction of the first pinion shaft 13. That is, the support holes 91, 92 extend to approach each other as they approach the main driving gear 52. The first support hole 91 includes two arc portions 91a that are separated from each other in the radial direction that is a direction in which the first support hole 91 extends, and two linear portions 91b that connect the two arc portions 91a in the radial direction. The arc portion 91a forms a semicircle obtained by dividing a perfect circle into two. The second support hole 92 has two arc portions 92a and two linear portions 92b as a configuration corresponding to the first support hole 91.

As shown in FIGS. 2 and 5, the first driven gear 53 has a first gear portion 71 and a first shaft portion 72. The first gear portion 71 has a disk shape. A plurality of teeth 71a is provided on an outer circumferential surface of the first gear portion 71. The teeth 71a of the first gear portion 71 engage with the teeth 52a of the main driving gear 52. The number of teeth 71a of the first gear portion 71 is set to be smaller than the number of teeth 52a of the main driving gear 52. The first shaft portion 72 extends from one side surface of the first gear portion 71 along the axis X of the first gear portion 71. An outer diameter of the first shaft portion 72 is set smaller than an outer diameter of the first gear portion 71. A recessed portion 72a having a depth in the axial direction of the first shaft portion 72 is provided at a tip end portion of the first shaft portion 72. A cross section of the recessed portion 72a orthogonal to the axial direction of the first shaft portion 72 has a circular shape. A first permanent magnet 73 is fitted into the recessed portion 72a. The first permanent magnet 73 is, for example, a so-called two-pole magnet in which one N pole is magnetized at one end thereof in the radial direction and one S pole is magnetized at the other end thereof in the radial direction. The first driven gear 53 is made of, for example, a resin.

Further, the second driven gear 54 has a configuration corresponding to the first driven gear 53. That is, the second driven gear 54 has a configuration corresponding to the first gear portion 71, the first shaft portion 72, and the first permanent magnet 73. That is, as shown in FIG. 5, the second driven gear 54 has a second gear portion 81, a second shaft portion 82, and a second permanent magnet 83. The number of teeth of the second driven gear 54 is different from the number of teeth of the first driven gear 53.

As shown in FIGS. 2 and 5, each of the magnetic sensors 62, 63 is provided on one end surface of the substrate 61 on the side facing each of the driven gears 53, 54, that is, one end surface on the upper side in the axial direction. For example, a Hall sensor is adopted as each of the magnetic sensors 62, 63. The first magnetic sensor 62 faces the first permanent magnet 73 in the axial direction. The second magnetic sensor 63 faces the second permanent magnet 83 in the axial direction. Each of the magnetic sensors 62, 63 detects a magnetic flux of a magnetic circuit formed by each of the permanent magnets 73, 83 as an electrical signal.

When the first pinion shaft 13 rotates through the operation of the steering wheel 11, the main driving gear 52 fixed to the input shaft of the first pinion shaft 13 rotates. As the main driving gear 52 rotates, each of the driven gears 53, 54 rotates through the engaging of the teeth 52a of the main driving gear 52 and the teeth 71a, 81a of each of the driven gears 53, 54. As each of the driven gears 53, 54 rotates, the magnetic flux of the magnetic circuit formed by each of the permanent magnets 73, 83 changes. Thus, in a state in which the first pinion shaft 13 is rotating, the magnetic circuit corresponding to the magnetic field of each of the permanent magnets 73, 83 is formed, and a magnetic flux corresponding to an amount of rotation of the first pinion shaft 13 is transmitted to each of the magnetic sensors 62, 63. Then, each of the magnetic sensors 62, 63 generates an electrical signal corresponding to the magnetic flux of the magnetic circuit induced according to the amount of rotation of the first pinion shaft 13. The control device 25 shown in FIG. 1 connected to each of the magnetic sensors 62, 63 calculates a rotation angle of the first driven gear 53 based on the electrical signal generated by the first magnetic sensor 62, and calculates a rotation angle of the second driven gear 54 based on the electrical signal generated by the second magnetic sensor 63. The control device 25 calculates a rotation angle θpa of the first pinion shaft 13 as a steering angle θs based on the calculated rotation angles.

As shown in FIG. 5, the first driven gear 53 is inserted into the first support hole 91 via the first tubular member 74. The first tubular member 74 has a cylindrical shape. The first tubular member 74 rotatably surrounds the first shaft portion 72. A length of the first tubular member 74 in the axial direction is set to be approximately the same as a length of the first shaft portion 72 in the axial direction. Further, an inner diameter of the first tubular member 74 is set to be slightly larger than an outer diameter of the first shaft portion 72 and to have a clearance with respect to the first shaft portion 72. The first tubular member 74 is made of a metal material capable of blocking magnetism. That is, the first tubular member 74 serves as a bearing that supports the rotation of the first shaft portion 72 and serves as a magnetic shield that blocks a magnetic leakage of the first permanent magnet 73 and thus prevents noise in the torque sensor device 41.

Further, an outer diameter of the first tubular member 74 is set to have a clearance between an outer circumferential surface of the first tubular member 74 and an inner circumferential surface of the arc portion 91a of the first support hole 91, that is, between the outer circumferential surface of the first tubular member 74 and inner circumferential surfaces of the two linear portions 91b of the first support hole 91. Furthermore, an outer diameter of the first gear portion 71 is set so that a side surface of the first gear portion 71 and a circumferential edge portion of the arc portion 91a of the first support hole 91, that is, the circumferential edge portions of the two linear portions 91b parallel to each other face each other in the axial direction. Thus, the first driven gear 53 is restricted from coming out of the first support hole 91 toward the substrate 61 side. The second tubular member 84 has a configuration corresponding to the first tubular member 74.

As shown in FIG. 2, the stopper 56 has a plate shape. The stopper 56 is mounted to cover portions of the support member 55 including the shaft portions 72, 82 of the driven gears 53, 54 from the side opposite to the substrate 61 in the axial direction. Thus, the driven gears 53, 54 are restricted from coming out of the support holes 91, 92 toward the side opposite to the substrate 61.

Figure 6:
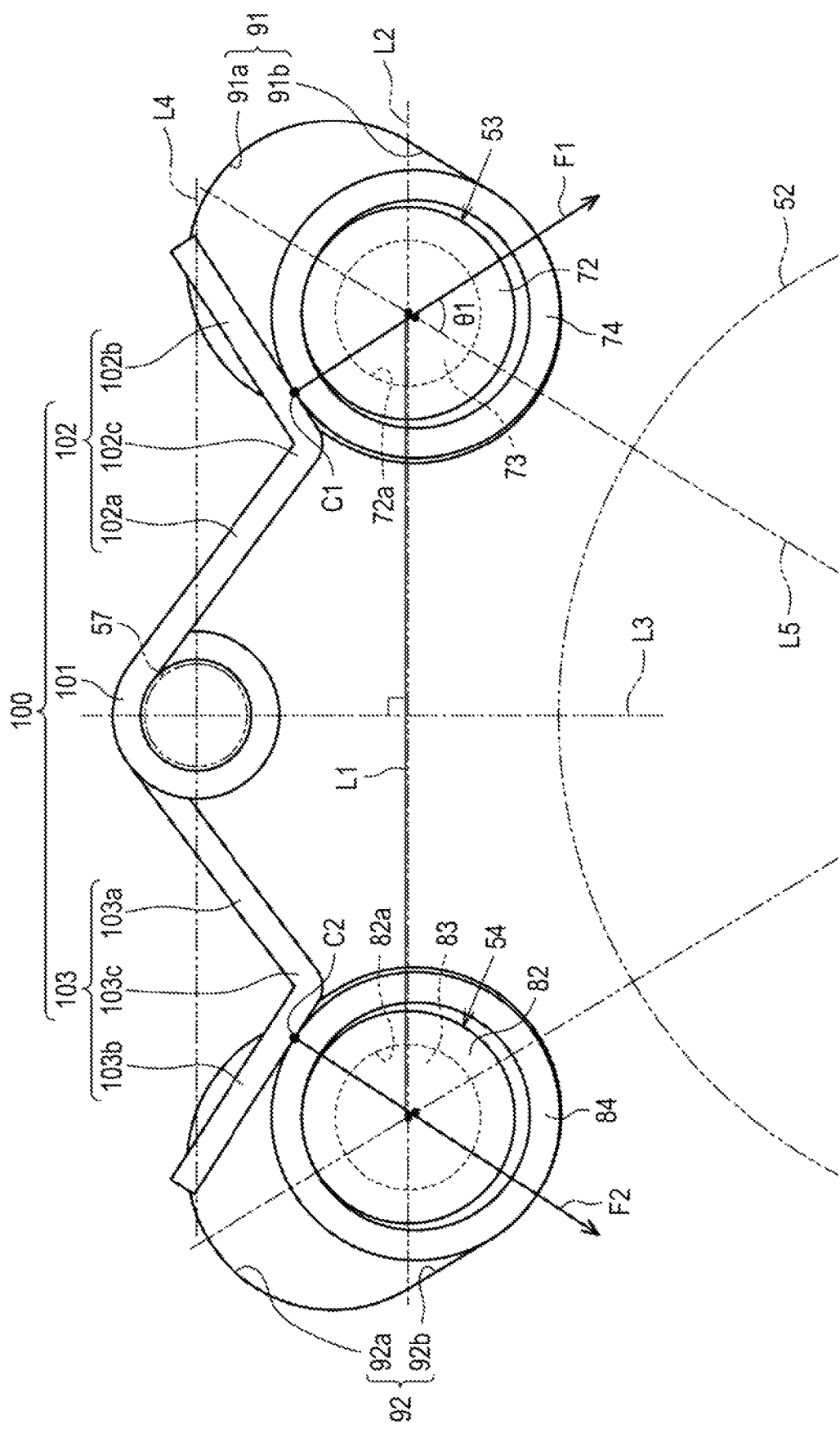
FIG. 6 is a schematic view schematically showing a positional relationship between a shaft portion, a tubular member, a support hole, and an biasing member according to an embodiment.

As shown in FIGS. 4 to 6, a coil support portion 57 for supporting the biasing member 100 is provided on the facing portion 55b of the support member 55. The coil support portion 57 has a columnar shape. The coil support portion 57 protrudes from the upper side in the axial direction that is the side opposite to the substrate 61 of the facing portion 55b.

Here, as shown in FIG. 6, when a line obtained by extending a line segment L1 connecting axes of the shaft portions 72, 82 of the first driven gear 53 and the second driven gear 54 is defined as a virtual line L2, the coil support portion 57 is configured to be located on the side opposite to the side on which the main driving gear 52 is provided with reference to the virtual line L2. Further, the coil support portion 57 is configured to be located on a vertical bisector L3 of the line segment L1, that is, in the center of the first driven gear 53 and the second driven gear 54 in the circumferential direction.

As shown in FIGS. 5 and 6, the biasing member 100 has a coil portion 101 and two arm portions of a first arm portion 102 and a second arm portion 103. The coil portion 101 is, for example, a metal wire wound in a coil shape so that bending stress is generated when a load is applied. Both ends of the coil portion 101 are configured to be at a position at which they substantially overlap with each other in the axial direction of the coil portion 101. The first arm portion 102 and the second arm portion 103 extending in different directions are provided at both ends of the coil portion 101. The coil portion 101 is adjusted so that both ends thereof are located on the side opposite to the side on which the main driving gear 52 is provided, and is supported by insertion into the coil support portion 57. Then, in a state in which the coil portion 101 is inserted into the coil support portion 57, the coil portion 101 generates bending stress when a load is applied in a direction in which the first arm portion 102 and the second arm portion 103 are deformed in a direction opposite to the side on which the main driving gear 52 is provided. That is, the biasing member 100 is a torsion coil spring.

The first arm portion 102 has a base end portion 102a, a tip end portion 102b, and a connecting portion 102c. The base end portion 102a extends from one of both ends of the coil portion 101 to the side on which the main driving gear 52 is provided. The tip end portion 102b extends from the base end portion 102a to the side opposite to the side on which the main driving gear 52 is provided.

Here, as shown in FIG. 6, when a line extending parallel to the virtual line L2 through the axis of the coil portion 101 is defined as a virtual line L4, in a state in which the coil portion 101 is inserted into the coil support portion 57, the first arm portion 102 extends to a range between the virtual line L2 and the virtual line L4. Then, in the first arm portion 102, the connecting portion 102c that is a portion to which the base end portion 102a and the tip end portion 102b are connected is configured to be located closest to the main driving gear 52.

Further, the second arm portion 103 has a configuration corresponding to the first arm portion 102. That is, the second arm portion 103 has a configuration corresponding to the base end portion 102a, the tip end portion 102b, and the connecting portion 102c. That is, as shown in FIG. 6, the second arm portion 103 has a base end portion 103a, a tip end portion 103b, and a connecting portion 103c.

In a state in which the coil portion 101 is inserted into the coil support portion 57, the biasing member 100 is assembled to the support member 55 to bias the first driven gear 53 together with the first tubular member 74 toward the main driving gear 52 through the first arm portion 102. Further, in a state in which the coil portion 101 is inserted into the coil support portion 57, the biasing member 100 is assembled to the support member 55 to bias the second driven gear 54 together with the second tubular member 84 toward the main driving gear 52 through the second arm portion 103.

Then, in a state in which a load is applied to the coil portion 101 in a direction in which the first arm portion 102 and the second arm portion 103 are deformed in the direction opposite to the side on which the main driving gear 52 is provided, the biasing member 100 is assembled to the support member 55. In this case, the biasing member 100 generates bending stresses F1, F2 corresponding to the load applied through the arm portions 102, 103 through the coil portion 101 as a force for biasing each of the driven gears 53, 54 toward the main driving gear 52. The bending stresses F1, F2 generated by the biasing member 100 can also be generated by applying a load to the connecting portions 102c, 103c, but the bending stress generated by the coil portion 101 is dominant.

Specifically, as shown in FIG. 6, the first arm portion 102 applies the bending stress F1 generated through the coil portion 101 by bringing the tip end portion 102b into contact with the outer circumferential surface of the first tubular member 74 inserted into the first support hole 91 from the side opposite to the side on which the main driving gear 52 is provided. In this case, a portion at which the tip end portion 102b and the outer circumferential surface of the first tubular member 74 come into contact with each other becomes a point of action C1 of the bending stress F1. At the point of action C1, the bending stress F1 acts in a first direction that is a direction orthogonal to a direction in which the tip end portion 102b extends. Thus, the first tubular member 74 is pressed through the outer circumferential surface thereof against the arc portion 91a on the main driving gear 52 side and the inner circumferential surface of the linear portion 91b on the side separated from the second support hole 92, that is, separated from the point of action C1, in the first support hole 91.

In this case, the first tubular member 74 operates in a second direction that is a direction that contributes to reduction of backlash generated between the first driven gear 53 and the main driving gear 52 while operating within a range of the clearance in the first support hole 91. The second direction coincides with a direction in which the first tubular member 74 together with the first driven gear 53 operates in the first support hole 91 in a direction in which the first support hole 91 extends. Further, the first tubular member 74 operates in a third direction that is a direction orthogonal to the second direction while operating within the range of the clearance in the first support hole 91. The third direction is a direction of approach to the linear portion 91b of the two linear portions 91b that is separated from the point of action C1, and coincides with a direction that is substantially orthogonal to the linear portion 91b. That is, in the present embodiment, the first direction in which the bending stress F1 acts is different from the second direction that is the direction that contributes to the reduction of backlash generated between the first driven gear 53 and the main driving gear 52.

The same applies to the second arm portion 103, and a portion at which the tip end portion 103b and the outer circumferential surface of the second tubular member 84 come into contact with each other becomes a point of action C2 of the bending stress F2. At the point of action C2, the bending stress F2 acts in the first direction that is a direction orthogonal to a direction in which the tip end portion 103b extends. The second tubular member 84 is pressed through the outer circumferential surface thereof against the arc portion 92a on the main driving gear 52 side and the inner circumferential surface of the linear portion 92b on the side separated from the first support hole 91, that is, the side separated from the point of action C2, in the second support hole 92. In this case, the second tubular member 84 operates in the second direction that is the direction that contributes to the reduction of backlash generated between the second driven gear 54 and the main driving gear 52 and the third direction that is the direction orthogonal to the second direction. That is, in the present embodiment, the first direction in which the bending stress F2 acts is different from the second direction that is the direction that contributes to the reduction of backlash generated between the second driven gear 54 and the main driving gear 52.

In the present embodiment, as shown in FIG. 6, a position of the point of action C1 obtained from the mutual positional relationship between the first driven gear 53 and the biasing member 100 is adjusted based on a plurality of parameters including a position at which the tip end portion 102b comes into contact with the first tubular member 74 and the angle θ1 formed by the bending stress F1 with respect to the second direction specified based on the position, that is, the first direction.

In the present embodiment, for example, a position at which the tip end portion 102b comes into contact with the first tubular member 74 is configured to be on the second support hole 92 side, that is, on the coil portion 101 side with reference to a virtual line L5 obtained by extending a line segment connecting the axes of the first tubular member 74 and the main driving gear 52 to each other, that is outside the first tubular member 74 in the radial direction. That is, the tip end portion 102b comes into contact with the first tubular member 74 at a portion on the second driven gear 54 side that is the other side of the first driven gear 53 to be biased.

In this way, the position of the point of action C1 is adjusted from a viewpoint that the bending stress F1 acts, the first tubular member 74 is pressed against the inner circumferential surface of the arc portion 92a on the main driving gear 52 side in the first support hole 91, and a sufficient magnitude can be obtained as a force for reducing backlash generated between the first driven gear 53 and the main driving gear 52. Further, the position of the point of action C1 is adjusted from a viewpoint that the bending stress F1 acts, the first tubular member 74 is pressed against the inner circumferential surface of the linear portion 91b on the side separated from the second support hole 92, that is, separated from the point of action C1 in the first support hole 91, and a sufficient magnitude can be obtained for a force for restricting an operation of the first driven gear 53 within the range of the clearance. The sufficient magnitude as the force for restricting the operation of the first driven gear 53 within the range of the clearance is experimentally obtained for a magnitude capable of maintaining a state in which the first driven gear 53 is pressed toward the inner circumferential surface of the first support hole 91 even when the main driving gear 52 rotates. In such experiments and the like, it is required that the angle θ1 formed by the first direction with respect to the second direction be, for example, an appropriate value such that the angle θ1 is "10°" or more and more preferably "20°" or more. This also applies to a position of the point of action C2. That is, the position of the point of action C2 is adjusted from a viewpoint that the bending stress F2 acts and a sufficient magnitude can be obtained as a force that reduces backlash generated between the second driven gear 54 and the main driving gear 52 and a force that restricts an operation of the second driven gear 54 in the circumferential direction of the main driving gear 52.

Figure 7:
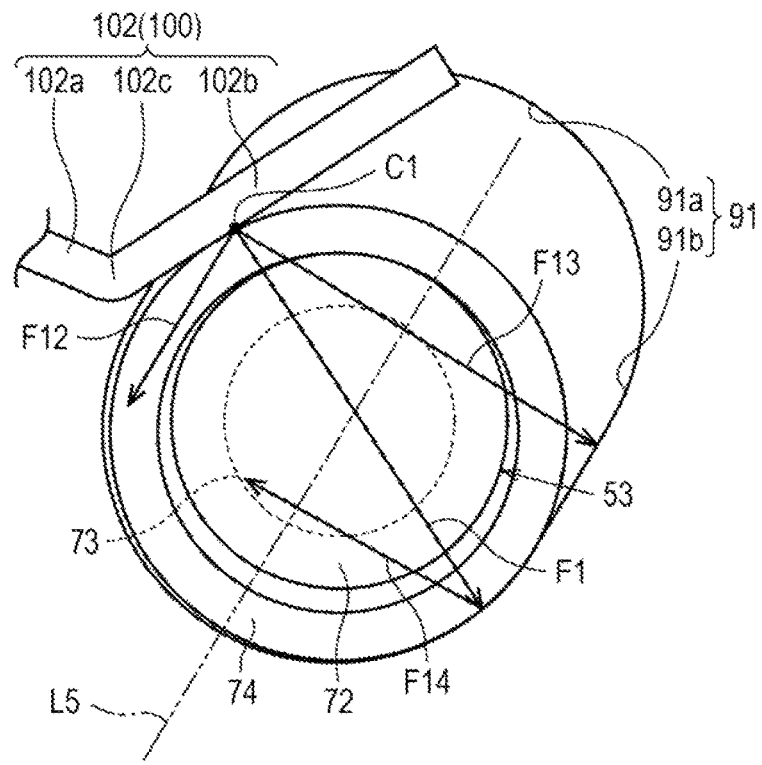
FIG. 7 is a schematic view schematically showing the positional relationship between the shaft portion, the tubular member, the support hole, and the biasing member according to the embodiment.

Hereinafter, the operation of the present embodiment will be described. In the present embodiment, as shown in FIG. 7, the bending stress F1 that is a force applied when the biasing member 100 biases the first driven gear 53 and acting in the first direction can be decomposed into a component force F12 that is a force acting in the second direction and a component force F13 that is a force in the direction orthogonal to the second direction. In other words, the bending stress F1 acting in the first direction is a resultant force of the component force F12 acting in the second direction and the component force F13 acting in the third direction.

In this case, the first tubular member 74 is pressed against the inner circumferential surface of the arc portion 91a on the main driving gear 52 side in the first support hole 91 due to an action of the component force F12 so that the first driven gear 53 is pressed toward the main driving gear 52. Thus, backlash generated between the first driven gear 53 and the main driving gear 52 is reduced while the bending stress F1 acts.

Further, the first tubular member 74 is pressed against the inner circumferential surface of the linear portion 91b on the side separated from the second support hole 92 in the first support hole 91 so that the first shaft portion 72 is pressed toward the inner circumferential surface of the first support hole 91 due to the action of the component force F13. Thus, while the bending stress F1 acts, the operation of the first driven gear 53 within the range of the clearance, for example, in the circumferential direction is restricted. That is, the operation of the first driven gear 53 is restricted even when the main driving gear 52 rotates.

Hereinafter, effects of the present disclosure will be described. In the present embodiment, the first direction in which the bending stress F1 acts is different from the second direction that is a direction that contributes to the reduction of backlash generated between the second driven gear 54 and the main driving gear 52. In this case, while the component force F12 is secured, the component force F13 can also be secured. Therefore, a change in the position of the first shaft portion 72 of the first driven gear 53 with respect to the corresponding first magnetic sensor 62 due to the shifting of the axis of the first driven gear 53 is curbed, and variation in accuracy of the detection results of the first magnetic sensor 62 can be curbed. This also applies to the second driven gear 54, and a variation in accuracy of the detection results of the corresponding second magnetic sensor 63 can be curbed.

Figure 8:
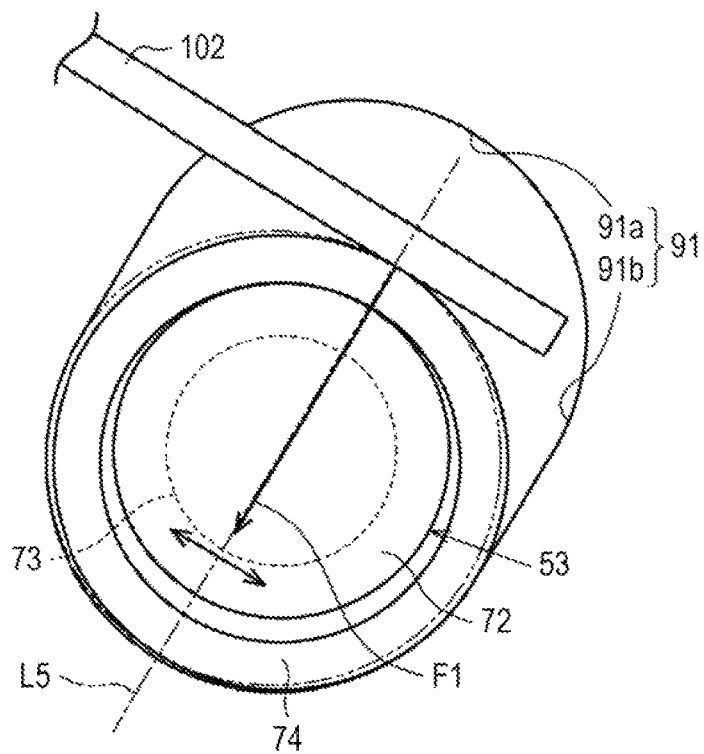
FIG. 8 is a view showing a force applied when the biasing member biases the tubular member according to a comparative example.

As shown in FIG. 8, the effect of the present embodiment is significant as compared with a comparative example in which the first direction in which the bending stress F1 acts coincides with the second direction that is the direction that contributes to the reduction of backlash generated between the first driven gear 53 and the main driving gear 52. In such a comparative example, the component forces F12 and F13 of the present embodiment are not present.

In the present embodiment, the positional relationship between the first driven gear 53 and the biasing member 100 is adjusted from the viewpoint that the bending stress F1 acts and a sufficient magnitude can be obtained as each of a force for reducing backlash generated between the first driven gear 53 and the main driving gear 52 and a force for restricting the operation of the first driven gear 53 in the circumferential direction of the main driving gear 52. That is, each of the component forces F12 and F13 is adjusted by adjusting the positions of the first driven gear 53 and the biasing member 100 so that an unnecessary increase in the component force F12 is curbed while a sufficient magnitude is secured as the component force F13. This also applies to positions of the second driven gear 54 and the biasing member 100 with respect to each other.

In the present embodiment, the positional relationship between the first driven gear 53 and the biasing member 100 with respect to the first support hole 91 having an elongated shape extending in the second direction is adjusted so that the third direction that is the direction in which the component force F13 acts is substantially orthogonal to the linear portion 91b of the two linear portions 91b that is separated from the point of action C1.

In this case, as shown in FIG. 7, a reaction force F14 due to the component force F13 is generated in the linear portion 91b of the two linear portions 91b of the first support hole 91 that is separated from the point of action C1. The reaction force F14 is generated as a normal force in defining a frictional force generated between the inner circumferential surface of the first support hole 91 and the outer circumferential surface of the first shaft portion 72 in a state in which it is pressed toward the inner circumferential surface. Thus, a state in which the first shaft portion 72 is pressed toward the inner circumferential surface of the first support hole 91 can be appropriately maintained. This also applies to the positions of the second driven gear 54 and the biasing member 100 with respect to each other, and a state in which the second shaft portion 82 is pressed toward the inner circumferential surface of the second support hole 92 can be preferably maintained.

In the present embodiment, a torsion coil spring having the coil portion 101 and configured so that the arm portions 102, 103 extend in different directions from both ends of the coil portion 101 is adopted as the biasing member 100. In this case, one member may be provided as the biasing member 100 for each of the driven gears 53, 54. Therefore, in the sensor device 24, an increase in the number of parts can be curbed.

In the present embodiment, in the biasing member 100, the tip end portions 102*b*, 103*b* of the first arm portion 102 and the second arm portion 103 come into contact with portions of the shaft portions 72, 82 of the driven gears 53, 54 to be biased on the driven gear side that is the other side the driven gears 53, 54 to be biased. In this case, the first direction becomes different from the second direction while the biasing member 100 biases the driven gears 53, 54 toward the main driving gear 52. Thus, even in the present embodiment in which the support member 55 should support the coil portion 101 on the side opposite to the side on which the main driving gear 52 is provided with reference to the virtual line L2, a configuration in which the operation of each of the driven gears 53, 54 can be restricted even when the main driving gear 52 rotates can be realized in the sensor device 24.

In the present embodiment, due to the tubular members 74, 84 being provided, the biasing member 100 is configured so that, in particular, the tip end portions 102*b*, 103*b* do not come into direct contact with the shaft portions 72, 82. Thus, it is possible to curb wear of the shaft portions 72, 82 due to direct contact of the tip end portions 102*b*, 103*b*.

The embodiment may be modified as follows. In addition, the following other embodiments can be combined with each other to the extent that they are technically consistent.
•Each of the tubular members 74, 84 can be deleted. That is, the tip end portions 102*b*, 103*b* of the biasing member 100 come into direct contact with the shaft portions 72, 82, and the bending stresses F1, F2 in which direct contact points are the points of action C1 and C2 act directly on the driven gears 53, 54. In this case, regarding the function of the magnetic shield possessed by each of the tubular members 74, 84, for example, a metal material capable of blocking magnetism similar to each of the tubular members 74, 84 may be mounted on the inner circumferential surface of each of the support holes 91, 92 or the outer circumferential surface of each of the shaft portions 72, 82.

Each of the tubular members 74, 84 may be made of a metal material capable of blocking magnetism, but may be made of, for example, a resin material. That is, each of the tubular members 74, 84 has only a function as a bearing that supports the rotation of each of the shaft portions 72, 82. In this case, regarding the function of the magnetic shield possessed by each of the tubular members 74, 84, for example, a metal material capable of blocking magnetism similar to each of the tubular members 74, 84 may be mounted on the inner circumferential surface of each of the support holes 91, 92 or the outer circumferential surface of each of the shaft portions 72, 82.

In the biasing member 100, if each of the force that reduces backlash generated between the first driven gear 53 and the main driving gear 52, and the force that restricts the operation of the first driven gear 53 in the circumferential direction of the main driving gear 52 can be obtained to have a sufficient magnitude due to the action of the bending stress F1, the position of the point of action C1 may be changed as appropriate. That is, the position at which the tip end portion 102*b* comes into contact with the first tubular member 74, and the angle θ1 formed by the bending stress F1 with respect to the second direction identified based on the position, that is, the first direction can be appropriately changed. This also applies to the bending stress F2, that is, the position of the point of action C2.

Figure 9:
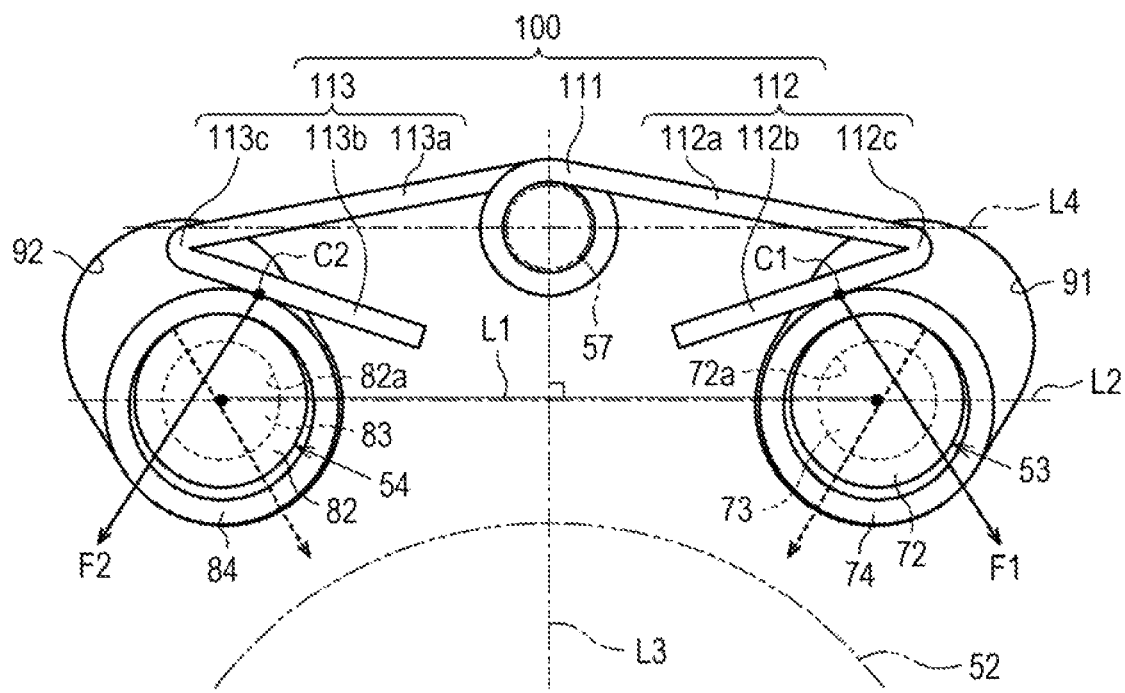
FIG. 9 is a schematic view schematically showing a positional relationship between the shaft portion, the tubular member, the support hole, and the biasing member according to another embodiment.

For example, as shown in FIG. 9, in the biasing member 100, shapes of the arm portions 102, 103 may be appropriately changed as long as the requirement that the first direction and the second direction be different from each other is satisfied. In this case, the arm portions 112 and 113 of the biasing member 100 extend from both ends of the coil portion 111 to the side on which the main driving gear 52 is provided with reference to the virtual line L2. The arm portions 112, 113 have base end portions 112*a* and 113*a* that extend from the coil portion 111 to be separated from each other in the circumferential direction, and tip end portions 112*b*, 113*b* that extend from the base end portions 112*a*, 113*a* to approach each other in the circumferential direction. Additionally, tip ends of the tip end portions 112*b* and 113*b* are configured to be located closest to the main driving gear 52. Further, the connecting portions 112*c* and 113*c* are configured to be located furthest apart from each other in the circumferential direction in the arm portions 112 and 113.

Figure 10:
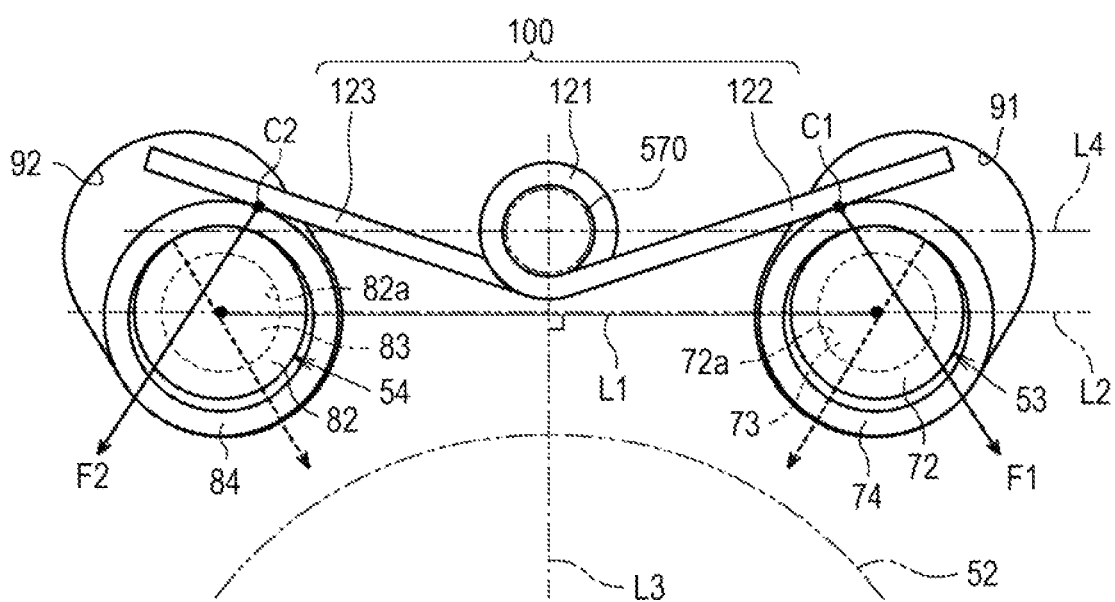
FIG. 10 is a schematic view schematically showing a positional relationship between the shaft portion, the tubular member, the support hole, and the biasing member according to still another embodiment.

For example, as shown in FIG. 10, in the biasing member 100, if the requirement that the first direction and the second direction be different from each other can be satisfied, and it is not necessary to support the coil portion 101 on the side opposite to the side on which the main driving gear 52 is provided with reference to the virtual line L2, the shapes of the arm portions 102, 103 may be changed as appropriate. In this case, the coil support portion 570 is configured to be located with respect to the coil support portion 57 of the embodiment so as to be shifted along the virtual line L4 to the side on which the main driving gear 52 is provided with reference to the virtual line L2. Then, the arm portions 122 and 123 of the biasing member 100 extend from both ends of the coil portion 121 to the side opposite to the side on which the main driving gear 52 is provided with reference to the virtual line L2. The arm portions 122 and 123 extend from the coil portion 121 to be separated from each other in the circumferential direction.

Figure 11:
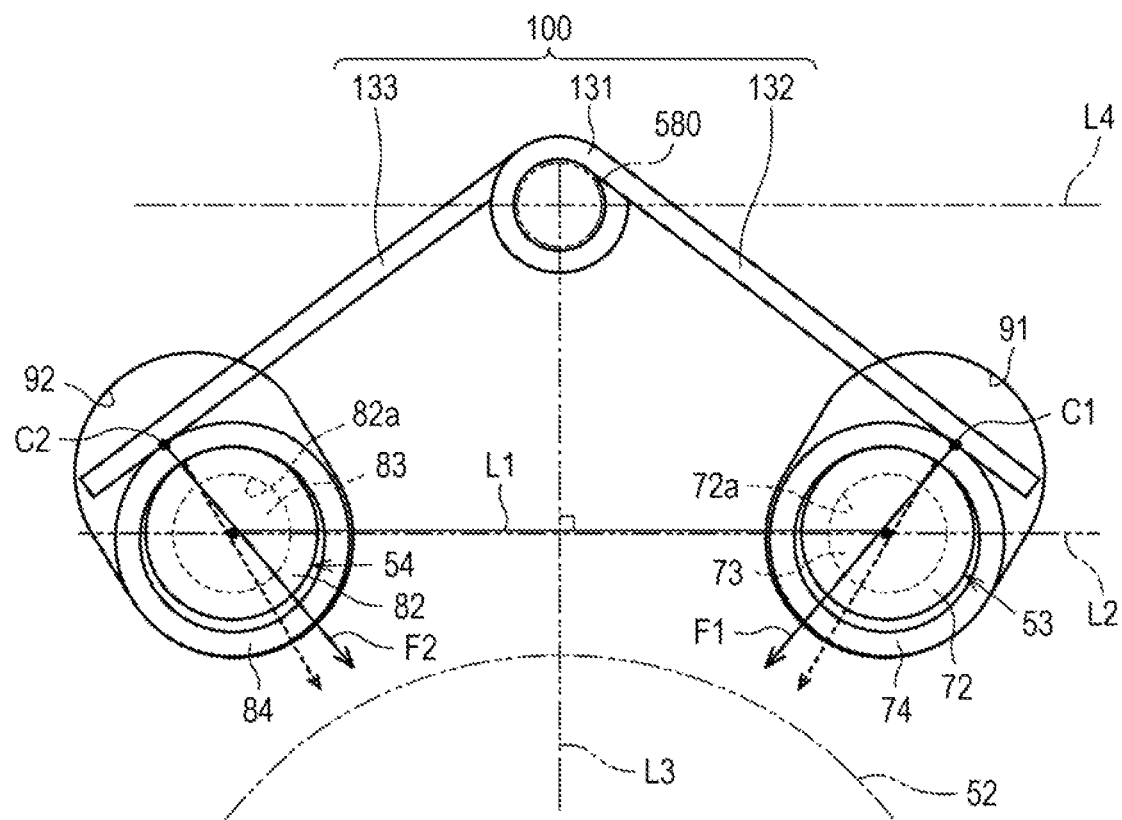
FIG. 11 is a schematic view schematically showing a positional relationship between the shaft portion, the tubular member, the support hole, and the biasing member according to still another embodiment.

For example, as shown in FIG. 11, in the biasing member 100, if the requirement that the first direction and the second direction be different from each other can be satisfied, and it is necessary to support the coil portion 101 furthest to the side opposite to the side on which the main driving gear 52 is provided with reference to the virtual line L2, shapes of the arm portions 132 and 133 may be changed as appropriate. In this case, the coil support portion 580 is configured to be located with respect to the coil support portion 57 of the embodiment so as to be shifted along the virtual line L4 on the side further opposite to the side on which the main driving gear 52 is provided with reference to the virtual line L2. Then, the arm portions 132 and 133 of the biasing member 100 extend from both ends of the coil portion 131 to the side on which the main driving gear 52 is provided with reference to the virtual line L2. The arm portions 132 and 133 extend from the coil portion 131 to be separated from each other in the circumferential direction. In this case, for example, a position at which the first arm portion 132 comes into contact with the first tubular member 74 is configured to be on the side opposite to the second support hole 92, that is, on the side opposite to the coil portion 131 with reference to the virtual line L5, that is outside the first tubular member 74 in the radial direction. That is, the first arm portion 132 comes into contact with a portion of the first tubular member 74 on the side opposite to the second driven gear 54 side that is the other side of the first driven gear 53 to be biased. This also applies to the second tubular member 84, that is, the second arm portion 133.

Figure 12:
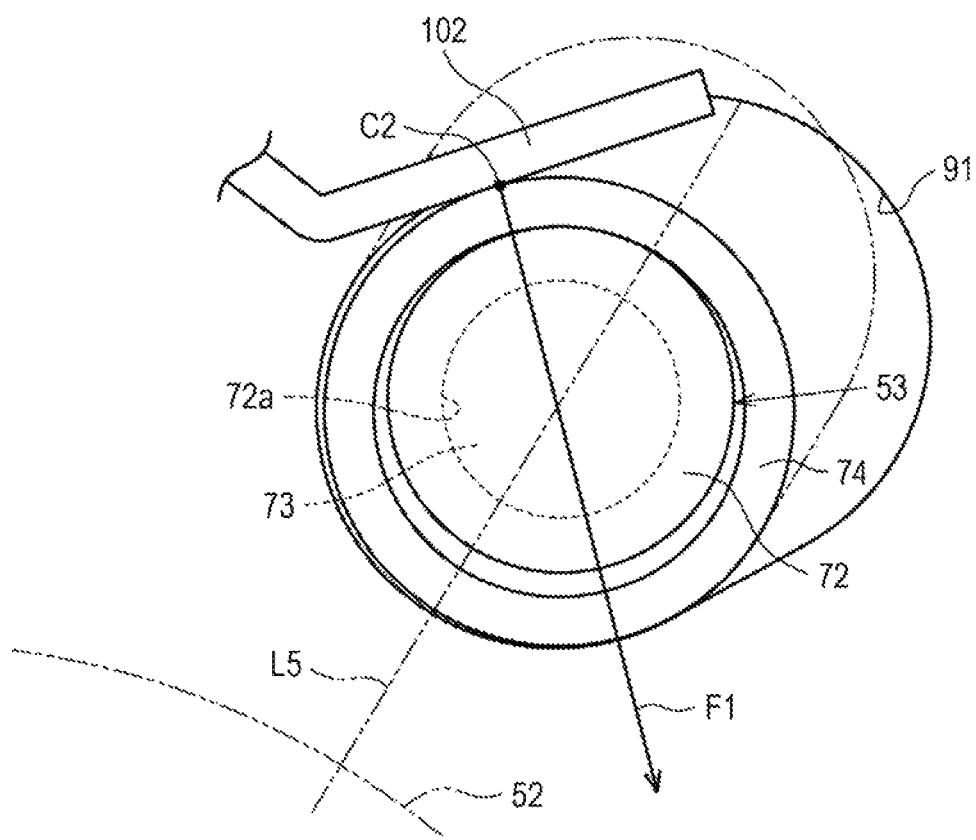
FIG. 12 is a schematic view schematically showing a positional relationship between the shaft portion, the tubular member, the support hole, and the biasing member according to still another embodiment.

For example, as shown in FIG. 12, in the support member 55, the direction in which the first support hole 91 extends may be appropriately changed. In this case, the first support hole 91 extends to intersect the virtual line L5 of the embodiment. This also applies to the second support hole 92.

The support holes 91, 92 may have a round hole shape when seen in the axial direction of the first pinion shaft 13. •Although a torsion coil spring may be used as the biasing member 100, a leaf spring, another coil spring, or the like may be used.

The biasing member 100 may be configured as an biasing member that individually bias each of the driven gears 53, 54. •The sensor housing 31 may be configured to have a function of supporting the driven gears 53, 54 and a function of supporting the biasing member 100. In this case, the sensor housing 31 serves as a support member.

In the sensor device 24, the driven gears 53, 54 are provided, but the number of the driven gears may be changed as appropriate. In this case, in the support member 55 and the biasing member 100, the numbers of the support holes and the arm portions may be changed according to the number of the driven gears. For example, there may be a single driven gear. Even with such a configuration, the rotation angle can be detected when the value is within 360 degrees. In this case, the support member 55 and the biasing member 100 may only have a single support hole and arm portion.

In the sensor device 24, the configuration of the torque sensor device 41 may be deleted. Hall sensors may be used as the magnetic sensors 46, 47, 62, 63, but magnetoresistive sensors may be used.

The steering device 10 in which the sensor device 24 is mounted may be an electric power steering device that applies torque of a motor to the steering shaft 12 as an assist force. Further, the steering device 10 may be a steer-by-wire type steering device in which a power transmission between a steering part connected to the steering wheel 11 and a turning part that turns the turning wheel 16 by operating the turning shaft 14 according to the steering input to the steering part is separated.

What is claimed is:

1. A sensor device comprising:
a main driving gear fixed to a rotating shaft to be detected;
driven gears each including a gear portion that engage with teeth of the main driving gear and provided with a shaft portion extending from a side surface of the gear portion along an axis of the gear portion;
a biasing member configured to bias the driven gears toward the main driving gear;
a support member having a support hole that rotatably supports the shaft portion, and configured to support the driven gears through support of the shaft portion and to support the biasing member; and
a sensor configured to generate an electrical signal based on rotation of the driven gears,
wherein, in a force applied when the biasing member biases the driven gears, assuming that a direction orthogonal to a tangent line at a point of action of the force is set as a first direction, the first direction is different from a second direction, and the second direction is a direction that contributes to reduction of backlash generated between the driven gears and the main driving gear while the driven gears operate toward the main driving gear when the driven gears are biased toward the main driving gear, wherein:
the driven gears include a first driven gear and a second driven gear,
the biasing member is a torsion coil spring including a coil portion that generates bending stress when a load is applied and two arm portions that extend in different directions from both ends of the coil portion,
the two arm portions include a first arm portion that biases the first driven gear toward the main driving gear side, and a second arm portion that biases the second driven gear toward the main driving gear side,
the support member includes a coil support portion that supports the coil portion,
the coil support portion is provided on a side opposite to a side on which the main driving gear is provided with reference to a virtual line obtained by extending a line segment that connects axes of the shaft portions of the first driven gear and the second driven gear, and
the coil portion generates bending stress while being supported by the coil support portion when a load is applied in a direction in which the first arm portion and the second arm portion are deformed to the side opposite to the side on which the main driving gear is provided,
the sensor device being configured such that:
each of the first arm portion and the second arm portion includes a base end portion that extends from the coil portion to the side on which the main driving gear is provided, and a tip end portion that extends from the base end portion to the side opposite to the side on which the main driving gear is provided, and
the tip end portion is a point of action of a force applied when the biasing member biases the driven gears.

2. The sensor device according to claim 1, wherein positions of the driven gears and the biasing member are adjusted so that, in a force acting in the first direction, a component force decomposed in a third direction has a magnitude that is able to maintain a state in which the driven gears are pressed toward an inner circumferential surface of the support hole even when the main driving gear rotates, and the third direction is a direction orthogonal to the second direction.

3. The sensor device according to claim 2, wherein:
the support member has the support hole having an elongated shape that extends in the second direction and having two arc portions that are separated from each other in the second direction and two linear portions that connect the two arc portions in the second direction, and
positions of the driven gears and the biasing member are adjusted so that the third direction intersects one of the two linear portions of the support hole that is separated from the point of action.

4. The sensor device according to claim 3, further comprising a tubular member that rotatably surrounds the shaft portion,
wherein the biasing member is configured to bias the driven gears toward the main driving gear through biasing of the tubular member.

5. The sensor device according to claim 2, further comprising a tubular member that rotatably surrounds the shaft portion, wherein the biasing member is configured to bias the driven gears toward the main driving gear through biasing of the tubular member.

6. The sensor device according to claim 1, further comprising a tubular member that rotatably surrounds the shaft portion,
wherein the biasing member is configured to bias the driven gears toward the main driving gear through biasing of the tubular member.

\* \* \* \* \*